(12) United States Patent
Pastoor et al.

(10) Patent No.: US 9,185,882 B2
(45) Date of Patent: Nov. 17, 2015

(54) FEED DEVICE

(71) Applicant: LELY PATENT N.V., Maassluis (NL)

(72) Inventors: Jan Lambertus Pastoor, Rijswijk (NL); Howard Sie, Rotterdam (NL); Arie Huyzer, Nieuw Lekkerland (NL)

(73) Assignee: LELY PATENT N. V., Maassluis (NL)

( * ) Notice: Subject to any disclaimer, the term of this patent is extended or adjusted under 35 U.S.C. 154(b) by 0 days.

(21) Appl. No.: 14/705,084

(22) Filed: May 6, 2015

(65) Prior Publication Data

US 2015/0230426 A1 Aug. 20, 2015

Related U.S. Application Data

(63) Continuation of application No. 13/881,808, filed as application No. PCT/IL2011/000072 on Nov. 3, 2011.

(30) Foreign Application Priority Data

Dec. 3, 2010 (NL) ...................................... 1038426
Mar. 11, 2011 (NL) ...................................... 1038669

(51) Int. Cl.
*B02C 19/00* (2006.01)
*A01K 5/00* (2006.01)
*A01F 29/00* (2006.01)

(52) U.S. Cl.
CPC ............... *A01K 5/004* (2013.01); *A01F 29/005* (2013.01); *B02C 19/00* (2013.01)

(58) Field of Classification Search
CPC ............ B02C 19/00; B01F 7/24; A01K 5/00; A01K 1/015; A01K 5/004

USPC ...................................................... 241/101.71
See application file for complete search history.

(56) References Cited

U.S. PATENT DOCUMENTS

| 5,294,064 A | 3/1994 | Faccia |
| 5,803,375 A | 9/1998 | Hartwig |

FOREIGN PATENT DOCUMENTS

| EP | 0 527 428 | 2/1993 |
| EP | 0 754 405 | 1/1997 |
| EP | 1 671 538 | 6/2006 |

OTHER PUBLICATIONS

International Search Report Issued Jan. 20, 2012 in PCT/NL11/00072 Filed Nov. 3, 2011.
International Preliminary Report on Patentability and Written Opinion of the International Searching Authority issued Jun. 4, 2013 in PCT/NL2011/000072 filed Nov. 3, 2011.

*Primary Examiner* — Mark Rosenbaum
(74) *Attorney, Agent, or Firm* — Oblon, Spivak, McClelland, Maier & Neustadt, L.L.P.

(57) ABSTRACT

Feed-mixing device comprising a container with a side wall having a dispensing opening which can be closed off with a slide in front of which a removing device is placed which, for example, comprises a roller with teeth. When the roller rotates, the teeth extend inside the side wall. On a first peripheral section of the roller, the teeth are placed in such a manner that they do not extend inside the side wall. Thus, the slide can be positioned in such a manner that it runs in a fluent and continuous manner with respect to the side wall, while the assembly still forms a compact arrangement.

20 Claims, 3 Drawing Sheets

FEED DEVICE

This is a continuation of U.S. Ser. No. 13/881,808 filed on Apr. 26, 2013, pending, which is a 371 application of PCT/NL11/00072 filed Nov. 3, 2011 and claims the benefit of NL 10 38669 filed Mar. 11, 2011 and NL 10 38426 filed Dec. 3, 2010. The contents of each of these applications are incorporated herein by reference in their enterity.

TECHNICAL FIELD

The present invention relates to a feed-dispensing device according to the preamble of claim 1, in particular comprising a container with a side wall and an, in particular substantially vertical mixing and/or cutting device which is situated inside said container and can be rotatably driven, wherein, in the side wall, a dispensing opening is provided which can be closed by means of a slide which is slidable along a path, wherein the feed-dispensing device also comprises a removing device for removing feed contained in the container therefrom, wherein the removing device comprises a body which is placed substantially in front of the dispensing opening and outside the container, parallel to the side wall, which body is rotatably driven about an axis and provided with a plurality of feed-entraining projections, wherein at least a plurality of, and in particular all, projections extend through the dispensing opening as far as into the container, at least in an operating position, when the body rotates.

PRIOR ART

U.S. Pat. No. 5,803,375 discloses a feed-mixing wagon with a receptacle containing a first cutting device. The side wall of the receptacle comprises an opening which is closable by means of a slide, and a second cutting device placed in front thereof. In a first embodiment, the second cutting device can be displaced inwards in such a manner that the knives of the second cutting device extend into the container. In another embodiment, the slide is convex, with the knives of the second cutting device extending into the container after the slide has been pushed up.

A drawback of the feed wagons known from U.S. Pat. No. 5,803,375 is the fact that they are either complex due to the second cutting device moving inwards, or cause disturbances in the circulation of the feed inside the container due to the inwardly directed slide when the latter closes the opening or due to the inwardly directed knives of the second cutting device. As a result thereof, the first cutting device will always have to be at a greater distance to the opening which may lead to a deterioration in the transfer of feed towards the opening.

SUMMARY OF THE INVENTION

It is an object of the present invention to at least partly eliminate the abovementioned drawbacks or at least to provide a usable alternative.

This object is achieved by a feed-mixing device of the kind mentioned in the preamble which is characterized by the fact that the feed-dispensing device furthermore comprises a positioning device which is configured to rotate the body about the axis until an at-rest position is reached in which all projections project less far into the container than an outermost peripheral path of all these projections. As long as there is a distance between the projections, there will always be a position in which the projections project less far into the container than the maximum, the outermost peripheral path, i.e. when the longest projection points straight into the container. Due to the fact that the projections project less far into the container in the at-rest position, the mixing and/or cutting device in the container and the removing device can in principle be placed more closely together, thus making it possible to ensure an improvement in the feed dispensation without having to displace, e.g. tilt or move, the removing device for this purpose. It is also possible for the peripheral paths and therefore the operating areas of the mixing and/or cutting device to overlap one another. It is, for example, possible for the mixing and/or cutting device to be active when the removing device is in an at-rest position and vice versa. It should be noted that in this case, it will be advantageous if the mixing and/or cutting device can then also be placed in a corresponding at-rest position.

It should be noted that the feed wagon known from U.S. Pat. No. 5,803,375 does not comprise such a control system, so that it is not possible to ensure that it is placed in an at-rest position: it is always possible for knives to project into the container to the maximum degree when the second cutting device is stationary. As a result thereof, it is still necessary to position the first and second cutting device further apart. Partly for this reason, the closing slide of the device known from U.S. Pat. No. 5,803,375 is curved convexly inwards, as the knives of the second cutting device are (may be) directed into the container to their maximum degree. This inward convex shape also has a disturbing effect on the circulation of feed in the container. With the present invention, the slide can be less convex, as the projection into the container which has to be taken into account is smaller. The slide can therefore have a more fluent shape with respect to the rest of the side wall, resulting in the very important advantage of improved mixing behaviour in the container. After all, the rotating feeder may more easily become caught behind every inwardly directed projection, such as a (more) convex slide, resulting in undesirable creeping and the like. The advantage of the present invention therefore lies in the positioning device which can ensure a more advantageous positioning of the removing device. All this will be explained in more detail below.

Advantageous embodiments of the present invention are described in the subclaims. In particular, the body, viewed in projection on a perpendicular plane to the axis, has a plurality of projections, and a first connecting line between a first pair of neighbouring projections is at a smaller distance to the axis than the distance to the axis of a second connecting line between two other neighbouring projections on the body, and the at-rest position comprises that the first pair of neighbouring projections are situated closest to, in particular directly in front of, the dispensing opening. More particularly, the second connecting line runs parallel to the dispensing opening, so that each of the two projections are situated as far as possible from the dispensing opening.

In this case, a plurality of projections are present in projection. They do not have to be situated in a perpendicular plane to the axis of rotation, but may also, for example, be provided in the form of a spiral or the like. It is even preferable to provide only one or at most two projections in a perpendicular plane to the axis of rotation, as this reduces the risk of elongate feed, such as grass, from being wound up.

Advantageously, the projections are dimensionally stable. This guarantees reliable positioning of the body, without movable or otherwise non-dimensionally stable projections interfering with the internal mixing and/or cutting device or with the mixing of the feed in the container. It should be noted that the connecting line is in each case accommodated between the respective ends of the projections, as this generally defines, at least in the at-rest position, a minimum demarcation to a surface, such as a slide. Of course, in the operating position or, more appropriately, in the operating state, that is to say with the body rotating, the space required for the rotating body will be determined by the projection, the end of which is furthest from the axis of rotation of the body, that is to say the extreme peripheral path.

Advantageously, the slide is formed and positioned in such a manner that the path of the slide intersects a peripheral path of at least a part of the projections in the operating position, and that the path does not intersect the projections in the at-rest position. Again, it is pointed out here that the operating position means that the body with the projections rotates. In this embodiment, optimum use is made of the possibilities which the body with the projections according to the invention offers. In the at-rest position, for example, the slide can be closed, so that the vertical mixing and/or cutting device in the container can perform its task without being disturbed. When the slide is opened, the removing device can be made to rotate, i.e. brought to its operating position, in order thus to remove feed, which is now thoroughly mixed and/or cut, from the container, and distribute it over, for example, a feeding location. On the one hand, this embodiment can be kept very compact, as the body with the projections can be placed very close to the container, in particular the dispensing opening. After all, in the at-rest position, the projections are effectively and guaranteed to be sufficiently far away from the dispensing opening. On the other hand, if the slide is of a suitable shape, the container may be formed in an optimum manner, that is to say, for example, as fluently as possible, without the slide in the closed position adversely affecting the operation of the vertical mixing and/or cutting device.

In particular, the slide is either straight or has a shape which substantially corresponds to the shape of the side wall. This means that the slide forms a fluent continuous shape with respect to the side wall, especially has the same curvature (radius) in the same direction. With regards to its shape, the slide can then form a part of a regularly shaped container. For example, said container is round and the slide has the same curvature radius as the rest of the side wall. Advantageously, the container is elliptical or at least elongate and rounded. In particular the side wall, with the slide in the closed position, is substantially mirror-symmetrical. In other words, the tip and/or bottom of the slide adjoins the side wall of the container. In these cases, optimum circulation of feed in the container is guaranteed without the slide projecting inwardly in an undesirable manner.

In embodiments, the slide may be slidable in an upward or horizontal direction, following the side wall. In such embodiments, the slide can thus be moved out of the way in an expedient manner without being too much in the path of either the mixing and/or cutting device or of the removing device. In the embodiment which follows the side wall, it is the non-exclusive preference to guide the slide, as it were as a sliding door, either inside the side wall, which in that case is configured to be double-walled at least locally, or on the outer side of the side wall in order not to disrupt mixing.

Advantageously, the slide can be folded or slid telescopically. Thus, for example, any double-walled portion of the side wall or increase in height of the device as a whole can be limited.

In particular, but not exclusively, the projections are identical in form, that is to say congruent. This ensures that the structure is simple and comprises a limited number of different components. In addition, all projections in principle thus have the same feed-entraining capacity. This applies in particular if the body which has been provided with the projections is cylindrical. Then, the respective ends of all the projections are at the same distance from the axis of rotation of the body. By distributing the projections in an irregular fashion across the periphery, it is possible for the connecting lines between (ends of) neighbouring projections to be at a different distance from the axis of rotation. In particular, there is an angle between the projections of the first pair of neighbouring projections of at least 80°, preferably at least 100°. A useful embodiment is, for example, an initially regular distribution from which one or more projections are removed, or at least a distribution in which the projections are substantially regularly distributed across a second complementary peripheral section and are missing from a first peripheral section which then forms a kind of gap in the distribution of the projections.

However, it is also possible to use a non-cylindrical body, such as an elliptical or flattened cylinder. Thus, it is possible for the connecting lines between (ends of) neighbouring projections to be at a different distance to the axis of rotation even with projections which are evenly distributed across the periphery. In yet another alternative embodiment, the body comprises a series of interconnected pipes or other elongate component bodies to which the projections are attached.

In yet another alternative embodiment, not all the projections protrude equally far from the axis of rotation. In the first peripheral section, there is then at least one projection, the end of which is at a smaller distance to the axis of rotation. This at least offers the advantage that it is not necessary to provide a section free of projections or at least a section where the projections are at a greater distance from one another, and that the feed can thus, in principle, be removed from the container in an even more even way. Of course, it is also possible to apply combinations of the abovementioned measures, such as a first peripheral section where the projections are at a greater distance apart and are lower/shorter and/or the body is flattened or otherwise asymmetrical.

In an advantageous embodiment, a first peripheral section is free of projections across at least 80°, preferably at least 100°. This ensures that the removing device can easily be positioned close to the dispensing opening, with a large range of ratios between the length/height of the projections and the cross section of the body. In the case of relatively short projections and/or a relatively large angle without projections, the body can generally be positioned nearer the dispensing opening. In particular, a projection is present in at least 3 and preferably in at least 5 positions, distributed across the second peripheral section which is complementary to the first peripheral section. With such a minimum number of projections, a more or less even removal of the feed is ensured. In this case, the theoretical case of one or two projections is indeed an alternative, but, in practice, this results in uneven removal. In practice, it has been found to be advantageous, depending on the distribution, viewed along the axis of rotation, to provide at least 5 projections distributed across the periphery. In this case, the number of projections, viewed in projection along the axis of rotation, may be smaller if they are (in each case) in one plane. It is then possible, for example, to provide a plurality of planes, each comprising four projections. However, if the projections are provided, for example in a helical shape, or at least spread more along the axis of rotation, it is preferable to provide more than four, for example in particular six or more, projections, viewed in projection along the axis of rotation.

The projections are preferably in the shape of narrowing wedges or rake tines. This improves the feed-removing ability of the projections, in particular with types of relatively long feed, such as hay and other stalk-containing products. Advantageous examples thereof are a triangular shape with or without rounded tip, and a hook shape.

The device according to the present invention comprises a positioning device for rotating the body up to or into the at-rest position. Of course, the expression "up to or into the at-rest position" is understood to mean an end position and not a position which is moved through during rotation, as this already occurs once during each rotation. The rotation up to or into the at-rest position can in principle be carried out by hand, for example by turning a handle. Advantageously, however, the positioning device comprises a sensor for measuring a rotation position of the body and for emitting a measured position signal, as well as a control circuit for rotating and/or detaining the body to and/or into the at-rest position on the basis of the position signal. Thus, it can automatically be ensured that the correct at-rest position is assumed. The sensor is advantageously an angle or rotation sensor which is configured, for example, as an inductive, optical, magnetic or mechanical sensor. Thus, a metal projection (such as a needle or the like) may be attached to the axis of the body, with an inductive sensor detecting whether said projection is situated opposite the sensor.

Alternatively or in addition thereto, the slide may be slidable in an upward direction and, at the bottom, comprises a narrowed part which has at least one ascending oblique side, which narrowed part is slidable between adjacent projections in such a manner that the oblique side positions the body by pushing away the projection touching the oblique side. Such a slide is suitable for detaining the body in the at-rest position.

The device furthermore advantageously comprises a drive device for driving the body in a rotating manner. As a result thereof, removal can easily be controlled and regulated. In addition, the at-rest position can be adjusted in a reliable manner due to the rotation of the body. Advantageously, the drive device furthermore comprises a brake or other stop means for detaining the body in the at-rest position. In particular, the drive device is configured for a maximum rotary speed of the body of at most 100 revolutions per minute. Not only is this amply sufficient for most removal operations, but it also offers the advantage that a non-rotationally symmetric removing device does not suffer from imbalance during rotation. In most cases, either the body itself will be non-cylindrical, or, if it is indeed cylindrical, the projections will not be evenly distributed or will not be congruent. This intrinsic imbalance of the removing device will become noticeable in an adverse manner at higher rotary speeds, such as, in particular, at rotary speeds suitable for cutting of feed. It should be noted that U.S. Pat. No. 5,803,375 specifically discloses a (second) cutting device with rotary speeds of 1000-3000 rpm.

In an advantageous embodiment, the distance between a bottom one of the projections which, in use, extend into the container and a bottom edge of the dispensing opening is at most equal to a working distance in which the bottom projection can entrain feed remnants from the bottom edge. This embodiment has an advantage that said positioning of the projection ensures the entrainment of any feed remnants from the bottom edge of the dispensing opening, as a result of which a slide can completely close the dispensing opening since there are no feed remnants on the contact surface of the bottom edge of the slide and the dispensing opening. In addition, the positioning of the projection in the abovementioned manner prevents any further loss of feed by ensuring complete contact between the slide and the bottom edge of the dispensing opening in the closed position. An additional advantage thereof is the fact that, when the mixing wagon is moved with a completely closed slide, no wear of the connection or hinges of the container occurs due to the slide and the bottom side of the dispensing opening not being in complete contact. In addition, new portions of feed are no longer contaminated with feed remnants as these are swept away by the projection.

In an advantageous embodiment, the body comprises a projection which, in use, extends underneath the container, wherein the distance between the container and said projection at most is equal to a working distance so that the bottom projection can entrain feed remnants from the bottom edge of the dispensing opening. This embodiment has the same advantages as the abovementioned embodiment. In this embodiment, the projection, or a plurality of such projections, move(s) underneath the container, and therefore the bottom edge and entrains feed remnants which hang from the latter. This also keeps the dispensing opening cleaner.

In an advantageous embodiment, the working distance is between 5 millimeters and 10 centimeters, preferably between 2 and 5 centimeters. Test results have shown that when the projection is positioned at the level of said distances, the cleanliness of the bottom of the dispensing opening is greatest. These distances apply to roughage (grass-based silage). When using feed which is, for example, granular, other dimensions may apply. The shape of the projections may differ and include: a tooth shape for a metal projection; a brush or one or more sticks for plastic materials, for example rubber. The projections may be fitted on the body in a fixed or detachable manner. Of course, any combination of the abovementioned variants is likewise possible.

BRIEF DESCRIPTION OF THE DRAWING

The invention will be explained briefly below with reference to the drawing, in which.

DESCRIPTION OF THE FIGURES

Figure 1:
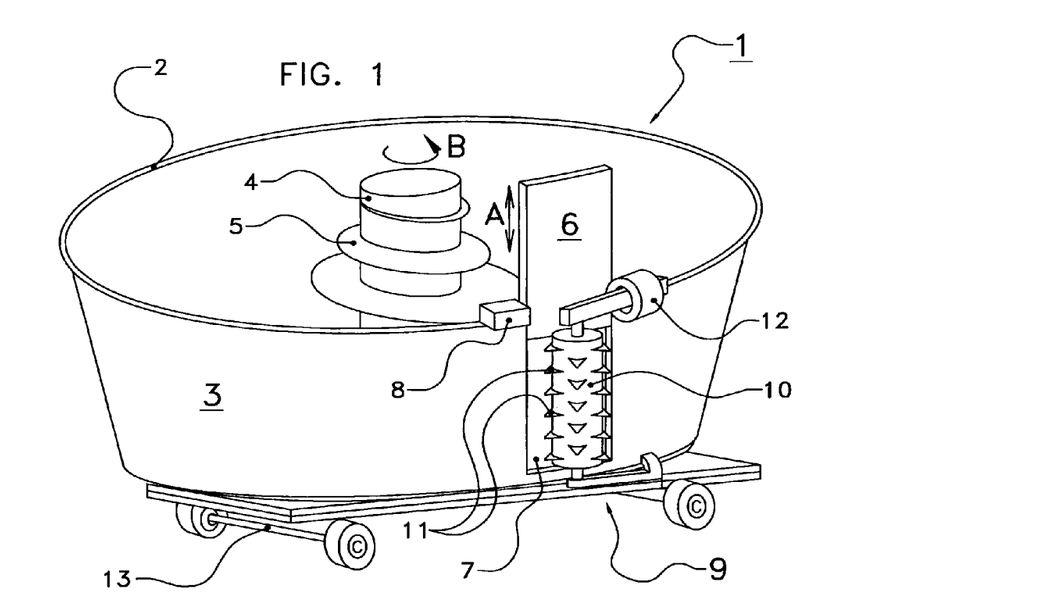
FIG. 1 shows a diagrammatic view in perspective of a device according to the invention.

FIG. 1 shows a diagrammatic view in perspective of a device 1 according to the invention. This comprises a container 2 with a side wall 3 and an internal mixing device 4 with an auger 5. Slide 6 can close off a dispensing opening 7 and can be moved by means of a slide motor 8.

Reference numeral 9 denotes a removing device which comprises a roller 10 with teeth 11 and a roller drive 12. Reference numeral 13 denotes an undercarriage.

The illustrated device 1 is particularly suitable for grass and grass products which have to be cut and/or mixed. This takes place in the container 2, which is a receptacle with an upright side wall 3. The receptacle 2 is often slightly elongate in order to prevent feed from just being rotated without being mixed or cut. This mixing and/or cutting is carried out here by means of a mixing device 4 which comprises an auger 5. If desired, it can also comprise a bottom scraper. The mixing device may, for example, rotate in the direction of arrow B.

Furthermore, the side wall 3 has a dispensing opening 7 which can be closed off by a slide 6. A slide motor 8, such as a stepping motor, serves to move the slide in the direction of double arrow A. The slide 6 has a shape which corresponds to the shape of the container 2 and the side wall 3, respectively. When the slide 6 is closed, the inside of the container 2 is smooth, without projections, and the side wall 3 runs in a fluent, symmetrical manner. Obviously, it is possible to use a slide which is shaped differently, but in that case a possible advantage of the invention may be missing.

A removing device 9 is placed in front of the dispensing opening 7 and comprises a roller 10 which is provided with teeth 11 and can be rotated by means of roller drive 12. In use, the teeth 11 extend into the container 2, while the roller 10 can be detained in a position, the at-rest position, in which the teeth 11 do not extend into the container 2 and the slide 6 can be closed.

The undercarriage 13 serves to move the device 1 as a whole. This makes it possible to dispense feed at different locations, for example in a feed alley. In this case, the device 1 can be moved by means of, for example, a tractor (not shown) or the like. Alternatively, the device 1 is self-propelled and to this end provided with a drive means and control means, likewise not shown here. It is also possible to use the device 1 as a static mixing and/or cutting device which can dispense mixed and/or cut feed to, for example, pulled or self-propelled feed-dispensing wagons.

Figures 2A, 2B:
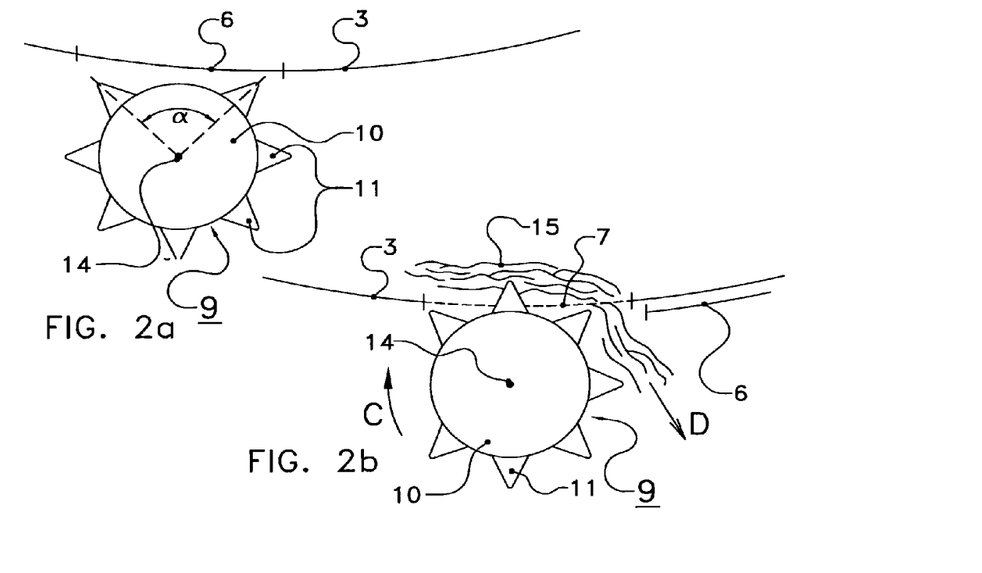
FIGS. 2a and 2b diagrammatically show a detail of the device with closed and open slide.

FIGS. 2a and 2b diagrammatically show a detail of a device according to the invention, comprising a removing device and a closed or open slide 6, respectively. In these, as in the rest of the drawing, similar parts are denoted by the same reference numerals.

In particular, FIG. 2a shows the removing device 9 with a roller 10 comprising a number of teeth 11 which are distributed over the circumference, with the exception of angle α. The roller 10 is rotatable about an axis 14. The slide 6 is situated in side wall 3 in the closed position. To this end, a first circumferential section of the roller 10, in this case essentially the section which is free from teeth and denoted by angle α, is placed directly in front of the dispensing opening, in this case thus in front of the slide 6. Since the first peripheral section is free from teeth, the roller 10 can be positioned very close to the slide 6 and the side wall 3. The distance between the axis 14 and the side wall 3 or slide 6 therefore does not need to be greater than the radius of the roller 10.

FIG. 2b shows the removing device 9, this time with the slide 6 in the open position after it has been pushed aside, along the side wall 3. The dispensing opening 7 is now free to dispense feed 15, such as hay, contained in the container in the direction of arrow D. This feed 15 is entrained by the teeth 11 on the roller 10, which is moved about the axis 14 in the direction of arrow C. It can clearly be seen that, during rotation, the teeth 11 of the roller 10 extend inside the container, thus ensuring effective entrainment of feed.

As the slide 6, due to the tooth-free peripheral section, can in fact be positioned in the peripheral path of the teeth 11, a very compact arrangement is possible which still ensures that the side wall 3 runs in a fluent manner: when the slide is closed, in principle there is no irregularity in the side wall 3 of the container 2, thus ensuring optimum and undisturbed mixing in the container. And the slide can be positioned in this manner due to the fact that the connecting line between two neighbouring projection tips, in practice usually the two projection tips on either side of the projection-free first peripheral section, comes closer to the roller than any other connecting line between two neighbouring projection tips. Conversely, an approximately straight slide 6 which, after all, will almost always have a curvature radius which is much larger than that of the body, the roller 10, will come close to the roller 10 up to said connecting line. This can therefore be closer with the first peripheral section than with any other peripheral section.

Figure 3:
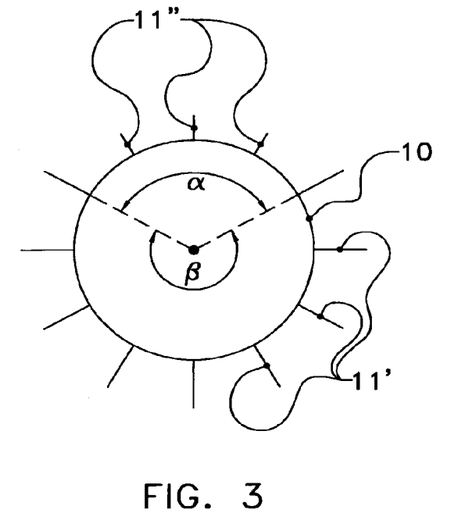
FIGS. 3 and 4 show alternative embodiments of the roller 10 with projections 11 of the removing device, in projection along the axis of rotation.
Figure 4:
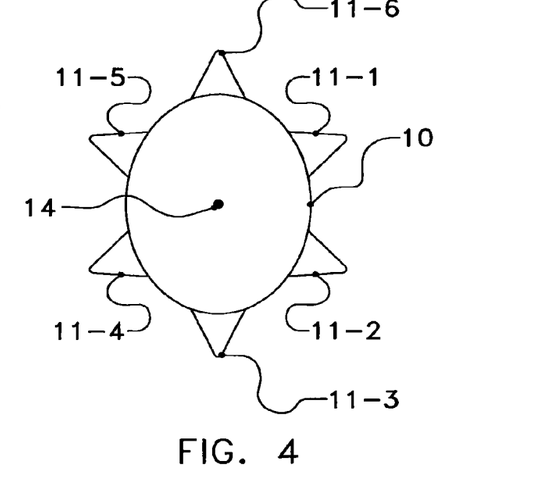

FIGS. 3 and 4 show alternative embodiments of the roller 10 with projections 11 of the removing device, in projection along the axis of rotation. FIG. 3 shows a roller 10 having teeth as projections and with a first peripheral section denoted by angle α and a second peripheral section denoted by angle β. In the first peripheral section, the teeth 11" are much shorter than the teeth 11' in the second peripheral section. Therefore, the at-rest position here is also the position in which the first peripheral section is turned towards the dispensing opening. The advantage of a section which is not completely free from projections is that the feed can also be entrained by the first peripheral section. Here, a first peripheral section is shown, the size of which is 120°. It will be clear that the precise delimitation of the first and second peripheral sections can be varied slightly, but is such that the three illustrated short teeth are inside the first peripheral section, and the nine long teeth inside the second peripheral section. Therefore, it is possible to alternatively speak of the angle between (the ends of) two neighbouring projections. It should be noted that it is a drawback of this embodiment that it is not rotationally symmetrical. At high rotary speeds of, for example, a few thousand revolutions per minute, such an asymmetry could result in an undesirable imbalance.

FIG. 4 diagrammatically shows a plan view of an elliptical, yet rotationally symmetrical roller 10 with congruent teeth 11-1, 11-2, . . . . Since these teeth are at different distances from the axis 14, the length of a connecting line between neighbouring projection tips and the axis 14 will differ. In particular, the distance between the connecting line from the tip of tooth 11-1 to the tip of tooth 11-2 and the axis 14 is smaller than the distance between the connecting line from the tip of tooth 11-1 to the tip of tooth 11-3 and the axis 14. In this case, there are therefore two first peripheral sections which can be positioned opposite the dispensing opening or slide, namely a section comprising only the two teeth 11-1 and 11-2, and an opposite section comprising only the teeth 11-4 and 11-5. It should be noted that this embodiment should in principle also be able to handle high rotary speeds. Other embodiments may also have two tooth-free sections which are positioned mutually opposite in a rotationally symmetrical manner. It should be noted that a roller or other body with, for example, a single or double row of teeth situated above one another may also function satisfactorily, as there is a reduced risk of grass or the like becoming wound up. In this case, only one or two teeth are visible in projection on a perpendicular plane to the axis of rotation. Obviously, such a roller can always be turned to an at-rest position in which no teeth extend into the container. However, in this case it is the positioning device which then turns the roller into said at-rest position.

Figure 5:
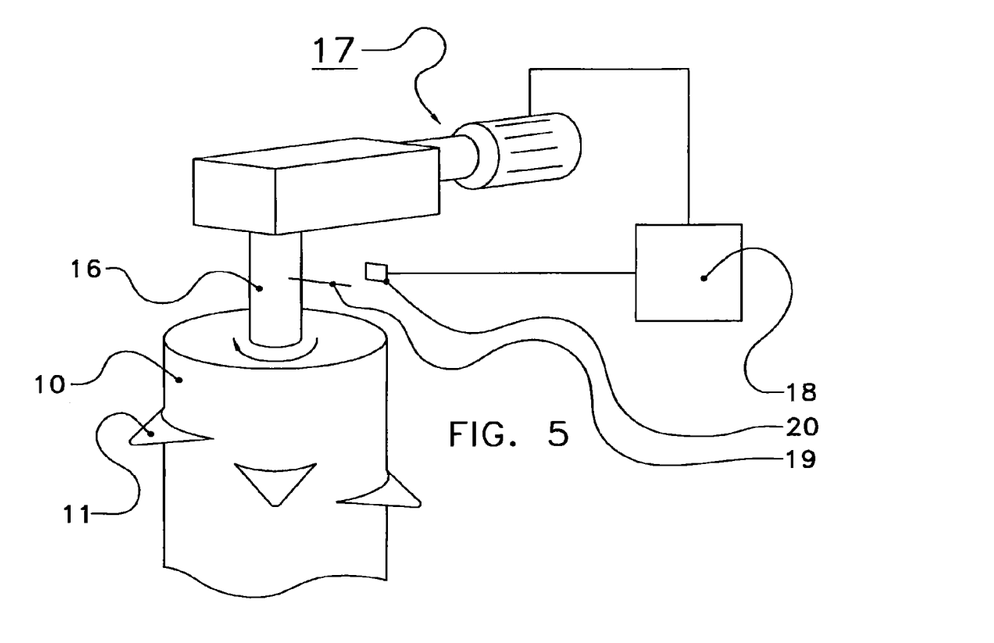
FIG. 5 shows a diagrammatic partial view in perspective of a drive for the removing device.

FIG. 5 shows a diagrammatic partial view in perspective of a drive of the removing device 9. The roller 10 comprises a axis 16 which is driven by motor 17 under the control of a control device 18. Furthermore, reference numeral 19 denotes a needle or the like made of metal or, for example, a magnet, and reference numeral 20 indicates an inductive sensor.

When the roller 10 rotates in the direction of the arrow, the needle 19 will pass the inductive sensor 20 once for each revolution, and thus generate a signal therein which is passed on to the control device 18. The latter can determine, on the basis of the signal, whether the roller 10 is in the at-rest position or not. As long as the roller 10 is not in the at-rest position, the control device 18 can allow the motor 17 to rotate. When the at-rest position has been reached, the motor can be switched off and possibly a brake may be applied. Obviously, many alternatives are conceivable to determine the position of the roller 10, such as an angle sensor, a magnetic sensor, etc.

Figure 6:
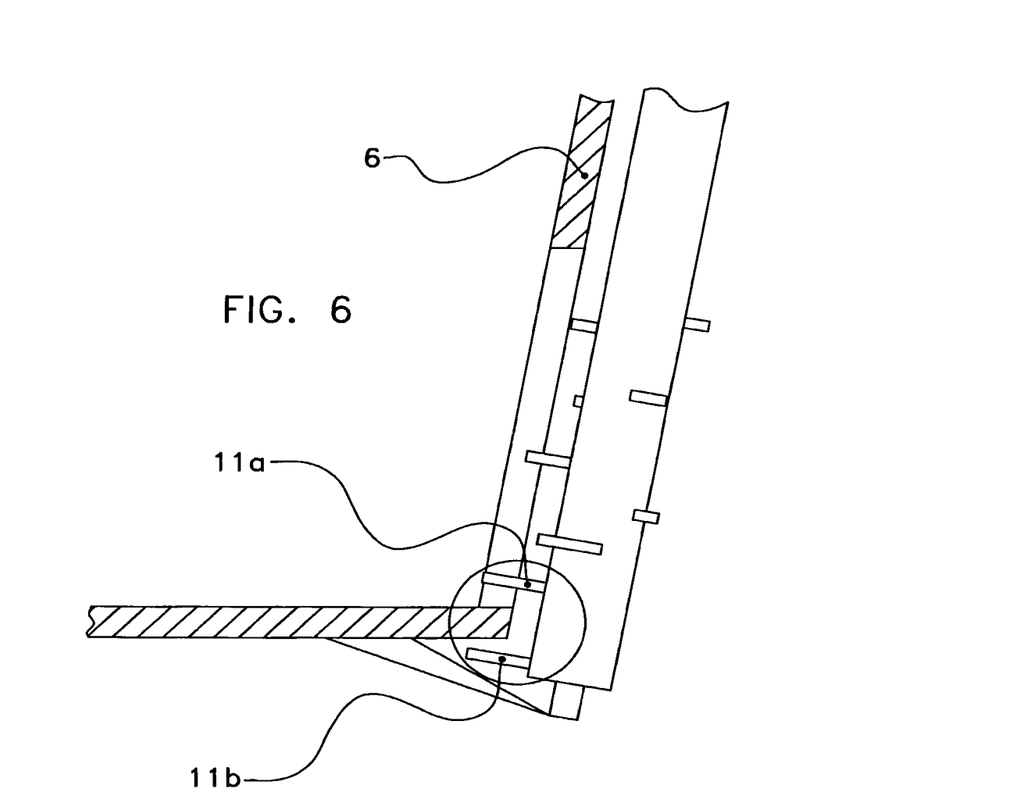
FIG. 6 shows a diagrammatic sectional view of a device according to the invention.

FIG. 6 shows a diagrammatic sectional view of a part of a device according to the invention, in this case with an open slide 6 and a pair of projections 11a and 11b which are positioned in such a manner that they can entrain feed remnants from the bottom edge of the dispensing opening 7 and the bottom of the container 2. After the feed has been dispensed via the dispensing opening 7, there may be a remnant of the feed, such as a tuft of grass, on the bottom of the container 2 as well as around the dispensing opening 7, mainly on the surface on which the slide 6, in the closed position, touches the bottom edge of the dispensing opening 7. The remnants may also protrude outside the dispensing opening 7, for example hang from the bottom edge of the bottom. If the feed remnants are so big that they are not removed from the bottom edge by the pressure of the slide 6 sliding down, this could lead to a slit between the slide 6 and the bottom edge of the dispensing opening 7. This may in turn cause loss of feed when the feed-dispensing device is being transported, wear of the connection or hinges of the slide 6 and the container 2, as well as contamination of new feed portions which come to lie on top of the remnants. In order to remove these remnants from the bottom edge of the dispensing opening 7 and the bottom, the roller 10 is provided with projections 11a and 11b, which are positioned in such a way that the projection 11a keeps the bottom edge of the dispensing opening 7 free from the feed remnants which may come to lie upon it, and the projection 11b keeps the bottom edge of the bottom of the container 2 free from the remnants which hang from it. The projections may be different in shape and may, for example, be tooth-shaped, if use is made of metal projections. It is also possible to use brushes or brush-like elements, which may be removable. When the roller 10 is being rotated, the projections come into contact with the abovementioned feed remnants and as a result of the bottom edge of the dispensing opening 7 being kept clean in this way, they keep the contact surface of the slide 6 and the bottom edge of the dispensing opening 7 free from the feed remnants, as a result of which there are no longer any impediments to the slide being closed.

Figure 7:
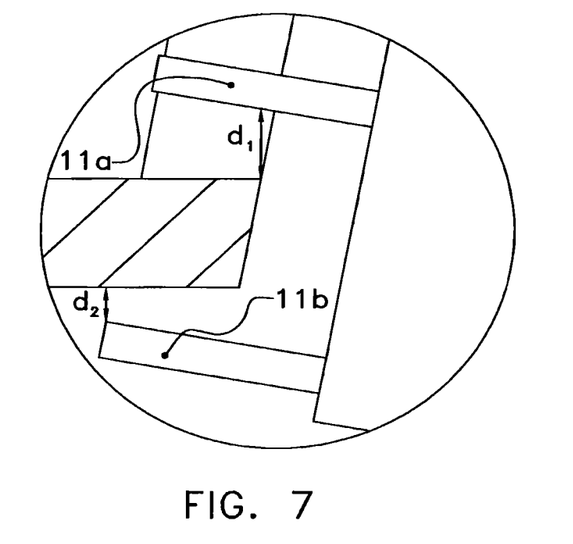
FIG. 7 shows a detail of FIG. 6.

FIG. 7 shows a detail of FIG. 6 with a device according to the invention in which the teeth of the roller 10 which can entrain the feed remnants being positioned in the vicinity of the bottom edge of the dispensing opening 7 and the bottom of the container. The distance d1 from the bottom edge of the dispensing opening 7 to a first projection from the bottom edge may have a height of between at least 5 millimeters and at most 10 centimeters. Test results have shown that a distance which is between 2 and 5 centimeters provides the best results. The same dimensions also apply to d2, which in turn do not have to be identical to those of d1, but do have to be in the same range of between at least 5 millimeters and at most 10 centimeters. These distances apply to roughage (grass-based silage). When using feed which is, for example, granular, other dimensions may apply.

The invention claimed is:

1. A feed-dispensing device, comprising:
    a container with a side wall;
    a substantially vertical, mixing and/or cutting device which is situated inside said container and can be rotatably driven;
    a removing device for removing feed contained in the container therefrom,
    wherein, in the side wall, a dispensing opening is provided which can be closed by means of a slide which is slidable along a path,
    wherein the removing device comprises a body which is placed substantially in front of the dispensing opening and outside the container, parallel to the side wall, which body is rotatably driven about an axis and provided with a plurality of feed-entraining projections,
    wherein at least a plurality of projections extend through the dispensing opening as far as into the container, at least in an operating position, when the body rotates,
    wherein the feed-dispensing device furthermore comprises a positioning device which is configured to rotate the body about the axis until an at-rest position is reached in which all projections project less far into the container than an outermost peripheral path of all these projections,
    wherein a section of the removing device body is free of projections such that in the at-rest position no projections project into the container, and
    wherein the axis of the removing device body is in the same position in the at-rest position as in the operating position.

2. The feed-dispensing device according to claim 1, wherein the body, viewed in projection on a perpendicular plane to the axis, has a plurality of projections, and a first connecting line between a first pair of neighbouring projections is at a smaller distance to the axis than the distance to the axis of a second connecting line between two other neighbouring projections on the body, and wherein the at-rest position comprises that the first pair of neighbouring projections are situated closest to, in particular directly in front of, the dispensing opening.

3. The feed-dispensing device according to claim 2, wherein there is an angle between the projections of the first pair of neighbouring projections of at least 100°.

4. The feed-dispensing device according to claim 1, wherein the slide is formed and positioned in such a manner that the path of the slide intersects the peripheral path of at least a part of the projections in the operating position, and that the path does not intersect the projections in the at-rest position.

5. The feed-dispensing device according to claim 1, wherein the slide is either straight or has a shape which substantially corresponds to the shape of the side wall, in particular has the same curvature, especially has the same curvature radius in the same direction.

6. The feed-dispensing device according to claim 1, wherein the side wall, with the slide in the closed position, is substantially mirror-symmetrical.

7. The feed-dispensing device according to claim 1, wherein the slide may be slidable in an upward or horizontal direction, following the side wall.

8. The feed-dispensing device according to claim 1, wherein the slide can be folded or slid telescopically.

9. The feed-dispensing device according to claim 1, wherein the projections are congruent with each other.

10. The feed-dispensing device according to claim 2, wherein there is an angle between the projections of the first pair of neighbouring projections of at least 80°.

11. The feed-dispensing device according to claim 1, wherein the projections of the first pair are shorter than other projections.

12. The feed-dispensing device according to claim 1, wherein the projections are in the shape of narrowing wedges or rake tines.

13. The feed-dispensing device according to claim 1, wherein the positioning device comprises a sensor for measuring a rotation position of the body and for emitting a measured position signal, as well as a control circuit for rotating and/or detaining the body to and/or into the at-rest position on the basis of the position signal.

14. The feed-dispensing device according to claim 1, furthermore comprising a drive device for driving the body in a rotating manner, wherein in particular the drive device is configured for a maximum rotary speed of the body of at most 100 revolutions per minute.

15. The feed-dispensing device according to claim 1, wherein the distance, which, in use, is minimal, between a bottom one of the projections which, in use, extend into the container and a bottom edge of the dispensing opening is at most equal to a working distance in such a manner that the bottom projection can entrain feed remnants from the bottom edge.

16. The feed-dispensing device according to claim 15, wherein the working distance is between 5 millimeters and 10 centimeters.

17. The feed-dispensing device according to claim 15, wherein the working distance is between 2 and 5 centimeters.

18. The feed-dispensing device according to claim 1, wherein the body comprises a projection which, in use, extends underneath the container, wherein the distance between the container and said projection at most is equal to a working distance so that the bottom projection can entrain feed remnants from the bottom edge of the dispensing opening.

19. The feed-dispensing device according to claim 18, wherein the working distance is between 5 millimeters and 10 centimeters.

20. The feed-dispensing device according to claim 18, wherein the working distance is between 2 and 5 centimeters.

* * * * *

UNITED STATES PATENT AND TRADEMARK OFFICE
CERTIFICATE OF CORRECTION

PATENT NO. : 9,185,882 B2
APPLICATION NO. : 14/705084
DATED : November 17, 2015
INVENTOR(S) : Jan Lambertus Pastoor et al.

It is certified that error appears in the above-identified patent and that said Letters Patent is hereby corrected as shown below:

On the title page, Item (63), the Related U.S. Application Data information is incorrect.
Item (63) should read:

Related U.S. Application Data

--(63) Continuation of application No. 13/881,808, filed as application No. PCT/NL2011/000072 on Nov. 3, 2011--

Signed and Sealed this
Twenty-ninth Day of March, 2016

Michelle K. Lee
*Director of the United States Patent and Trademark Office*